July 9, 1935.  J. WARDLE  2,007,780
APPARATUS FOR STRAINING LIQUIDS OR GASES
Filed July 1, 1933  3 Sheets-Sheet 1
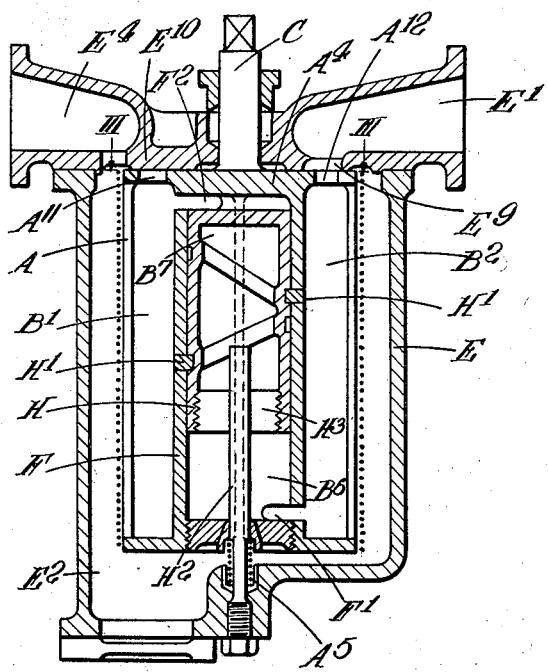
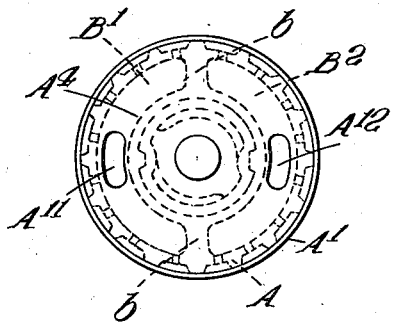
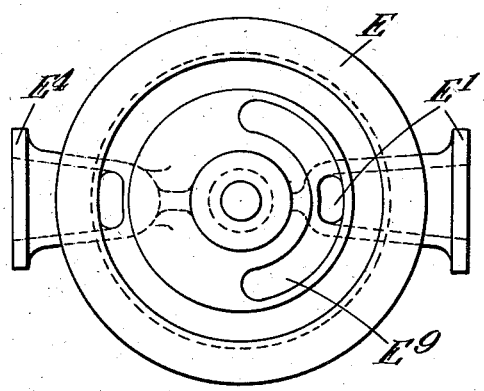
JOHN WARDLE
INVENTOR
BY Haseltine, Lake & Co.
ATTORNEYS

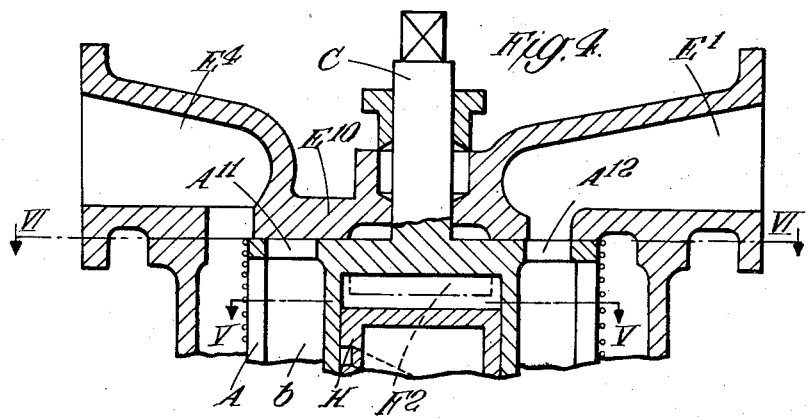
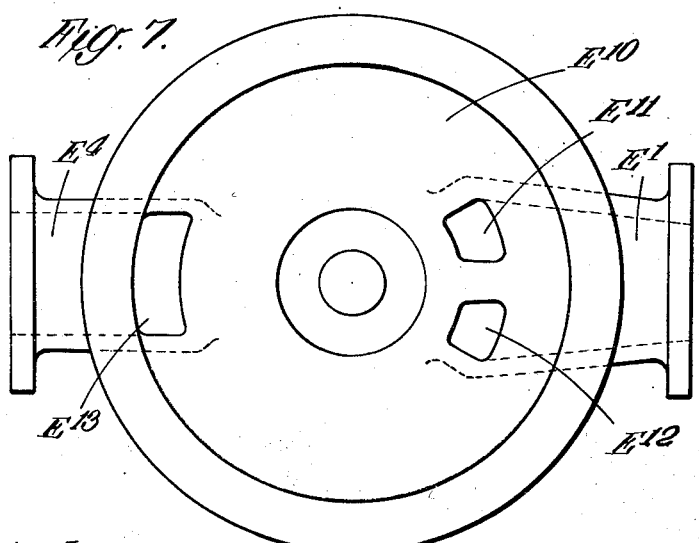
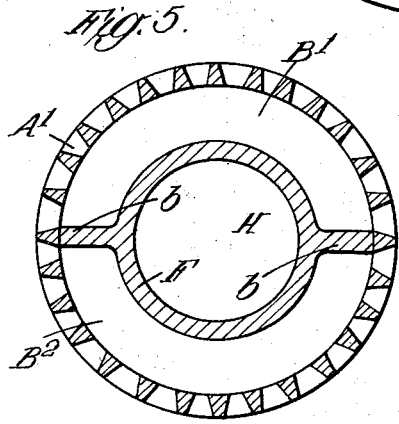
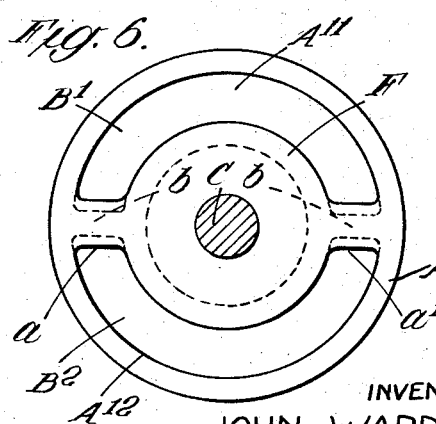

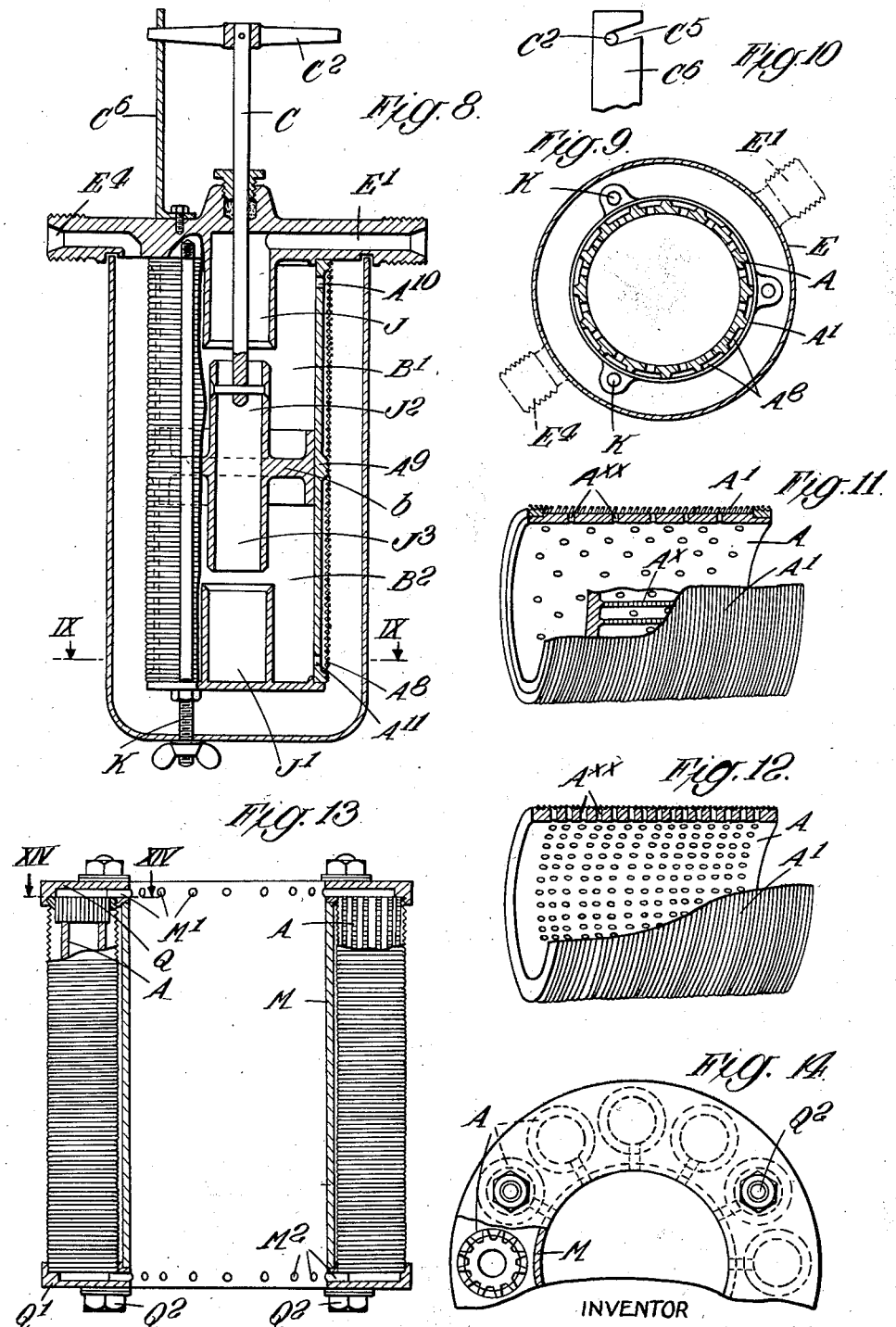

Patented July 9, 1935

2,007,780

UNITED STATES PATENT OFFICE 2,007,780

APPARATUS FOR STRAINING LIQUIDS OR GASES

John Wardle, Westminster, London, England, assignor to Lolos Strainers Limited, Barrow-in-Furness, England, a British company Application July 1, 1933, Serial No. 678,691
In Great Britain January 27, 1932

10 Claims. (Cl. 210—167)

This invention relates to apparatus for straining liquids or gases of the kind in which cleaning of the straining means is effected by a reverse flow of the liquid or gas, i. e., a flow in the opposite direction to the normal flow. The chief object of the invention is to provide an improved arrangement for effecting this reverse flow.

In order that the invention may be clearly understood and readily carried into effect the same will now be described with reference to the accompanying diagrammatic drawings and will be hereinafter defined in the appended claims.

In the drawings:—

Figure 1 is a vertical section of one form of apparatus made in accordance with the invention;

Figure 2 is a view of the underneath surface of an outer casing cover shown in Figure 1;

Figure 3 is a plan view on the line III—III in Figure 1;

Figure 4 is a vertical section of the other portion of an apparatus similar to that shown in Figure 1 but modified so that the whole of the area of the straining means is normally utilized for straining the liquid or gas;

Figure 5 is a section on line V—V in Figure 4;

Figure 6 is a section on the line VI—VI in Figure 4;

Figure 7 is a view of the underneath surface of an outer casing cover to be described and which is shown in Figure 4;

Figure 8 is a vertical section of a further form of the apparatus;

Figure 9 is a section on line IX—IX in Figure 8 showing only the casing and straining means;

Figure 10 is a detail to be described of a part shown in Figure 8;

Figures 11, 12, 13, and 14, illustrate various forms of straining means suitable for use with any of the forms of apparatus shown in the above mentioned figures.

In the construction shown in Figures 1, 2, and 3, the straining means comprises a perforated tubular or cylindrical strainer body A and wire $A^1$ wound helically on the exterior of the strainer body A. Located concentrically within the strainer body is a cylinder F between which and the strainer body is a space on the outlet side of the straining means. This space is divided by partitions $b$ into separate sections $B^1$, $B^2$. The interior $B^6$ of one end of the cylinder F communicates with the section $B^2$ through a port $F^1$ and the interior $B^7$ of the cylinder F at its other end is in communication by a port $F^2$ with the section $B^1$. The ends $B^6$, $B^7$, of the cylinder F constitute in effect parts of the sections $B^2$, $B^1$, respectively.

Within the cylinder F is a piston H (which constitutes a movable partition between the parts $B^6$, $B^2$, and $B^7$, $B^1$, respectively), encircling the piston diagonally at opposite angles and engaged by pegs $H^1$ carried by the cylinder F. Rotation of the piston H is prevented by engagement of a square rod $H^2$ in a square aperture formed in a plug $H^3$ carried by the piston H. One end $A^4$ of the strainer body A constitutes a valve plate having ports $A^{11}$, $A^{12}$, in communication respectively with the sections $B^1$, $B^2$. The valve plate is yieldingly held by a spring $A^5$ against the adjacent wall or cover $E^{10}$ of the casing E in which wall is a groove $E^9$ leading to the outlet $E^1$. The strainer body is connected to the spindle C. With the ports in the position shown in Figure 9 rotation of the strainer body A will cause the piston H to descend by reason of the pegs $H^1$ and the slots which they engage thereby forcing the liquid or gas from the end $B^6$ of the cylinder F into section $B^2$ and (when the valve plate $A^4$ shuts off communication between the sections $B^2$ and the outlet $E^1$) out of the strainer body through the straining means in the opposite direction to the normal flow thereby cleaning the straining means adjacent to the section $B^2$. Continued rotation of the strainer body A will similarly cause the straining means adjacent to the section $B^1$ to be cleaned.

Figures 4, 5, 6, and 7, illustrate a modified form of the apparatus shown in Figures 1, 2, and 3, in which modification the whole of the area of the straining means is normally utilized for straining the liquid or gas. A cover $E^{10}$ comprising a detachable part of the casing E is formed with two outlet ports $E^{11}$, $E^{12}$, and a diametrically opposite inlet port $E^{13}$. The ports $A^{11}$, $A^{12}$, are extended into almost semi-circular shape leaving only narrow strips $a$, $a^1$, connecting the strainer body A to the cylinder F. The vanes $b$ and strips $a$, $a^1$, are normally located on one side of the strainer between the outlet ports $E^{11}$, $E^{12}$, and on the other side centrally of the inlet port $E^{13}$, so that normal flow of liquid or gas can occur through both halves of the straining means simultaneously. Rotation of the straining means will shut off communication with the outlet ports $E^{11}$, $E^{12}$, of the sections $B^1$, $B^2$, alternately, during which time the piston H is reciprocated to effect cleaning. During rotation of the straining means, cleaning flow occurs through one of the sections $B^1$, $B^2$, whilst the normal flow continues through the other section.

Figures 8, 9, and 10, illustrate a further modification in which the normal flow of liquid or gas occurs from the outside of the strainer body to the interior thereof. The sections $B^1$, $B^2$, are divided by the partition $b$ which comprises a piston which can be reciprocated by a reciprocatory movement of the spindle C to which it is connected. The casing E is formed with inwardly directed concentric tubular portions J, $J^1$, and the piston is provided with tubular portion $J^2$, $J^3$, projecting in opposite directions and adapted to enter and form a sliding fit within the tubular portions J, $J^1$, respectively. The strainer body A is provided with grooves $A^8$ through which the liquid or gas passes after having passed between the helices of the wire $A^1$. The grooves $A^8$ are divided into upper and lower series by a rib $A^9$. The upper grooves are provided at their upper ends with apertures $A^{10}$ communicating with the section $B^1$ and the lower series of grooves are provided at their lower ends with apertures $A^{11}$ that communicate with the section $B^2$. The tubular portion J is in communication with the outlet $E^1$. The piston $b$ is normally maintained in its midway position opposite the rib $A^9$ by engagement of the handle $C^2$ in a slot $C^5$ in a plate $C^6$ that is attached to the casing E. In this normal position substantially the whole of the straining means is utilized and liquid or gas from the section $B^2$ passes through $J^3$, $J^2$, and J to the outlet $E^1$ whilst liquid or gas from the section $B^1$ passes through J to the outlet $E^1$. For cleaning the straining means the handle $C^2$ is moved out of the slot $C^5$ by a small rotary movement and is then reciprocated to move the piston $b$ first to one end of its stroke and then to the other end of its stroke and finally back to its midway position. When the piston $b$ is moved from its midway position downwards the extension $J^3$ enters the tubular portion $J^1$ thereby shutting off communication between the section $B^2$ and the outlet. Continued movement of the piston $b$ downwards forces liquid or gas from the section $B^2$ outwards through the straining means in the reverse direction to the direction of normal flow to effect cleaning. Similarly movement of the piston $b$ from its midway position upwards causes the extension $J^2$ to enter the tubular portion J thereby shutting off communication between section $B^1$ and the outlet $E^1$ whereupon continued upward movement causes liquid or gas from the section $B^1$ to be forced outwards through the upper half of the straining means to effect cleaning. The strainer body is held in position within the outer casing by means of bolts K.

Figures 11, 12, 13, and 14, show types of straining means each of which can be adapted for any of the strainers illustrated in the drawings above described. In Figure 11 the strainer body A is shown provided with its external surface with longitudinal ribs $A^x$ which communicate through apertures $A^{xx}$ with the interior of the strainer body A. The straining wire $A^1$ is wound spirally on the exterior of the strainer body.

Figure 12 shows a somewhat similar arrangement but without the ribs $A^x$ and having a greater number of apertures $A^{xx}$. Figure 13 is a vertical section of a straining device having a large straining area and Figure 14 is a part plan thereof the lower left-hand corner of Figure 14 being a section on the line XXII—XXII in Figure 13. The arrangement comprises a number of tubular straining bodies A arranged in cylindrical formation about a cylinder M. The strainer bodies A and cylinder M are clamped between a head plate Q and a base plate $Q^1$ by bolts $Q^2$. The liquid or gas passes from the exterior into the interior of the strainer body whence it passes through passages $M^1$ in the head plate Q and passages $M^2$ in the base plate $Q^1$ into the interior of the cylinder M. The cleaning devices are to be located within the cylinder M.

Instead of helically wound wire the strainer may be built up of annular discs having suitable spacing members or on annular discs indented or serrated to form the straining apertures or the strainer body may be covered with gauze, perforated sheet, fabric, indented wires, or other suitable means.

If desired means may be provided for a continuous drive so that the cleaning operation is continuous throughout the period that the strainer is in use.

What I claim and desire to secure by Letters Patent of the United States is:—

1. Apparatus for straining fluids comprising cylindrical straining means having a cylindrical straining area, a piston arranged so as at all times to separate one section of the space on the outlet side of the straining means from another section of said space, an outlet port in continuous communication with the unstrained fluid through the interposed straining means and strained fluid, means to prevent escape of fluid from each of said sections at different periods whilst escape of fluid from the other section continues, and means to move the piston to reduce the volume of each section separately the outlet of which is at that time closed thereby providing a cleaning flow of fluid in the opposite direction to that of the normal flow without withdrawing fluid for the cleaning flow from the section in which normal flow of fluid continues.

2. Apparatus for straining fluids comprising cylindrical straining means having a cylindrical straining area, a piston arranged so as at all times to separate one section of the space on the outlet side of the straining means from another section of said space, an outlet port in continuous communication with the unstrained fluid, through the interposed straining means and strained fluid, means other than the piston to prevent escape of fluid from each of said sections at different periods whilst escape of fluid from the other section continues and means to move the piston to reduce the volume of each section separately the outlet of which is at that time closed thereby providing a cleaning flow of fluid in the opposite direction to that of the normal flow without withdrawing fluid for the cleaning flow from the section in which normal flow of fluid continues.

3. Apparatus for straining fluids comprising cylindrical straining means having a cylindrical straining area, a casing within which said means is mounted thereby providing a space between said means and the casing, said casing having an inlet port and an outlet port one of said ports communicating with the space within the straining means and the other port communicating with the space between said means and the casing, a piston arranged so as at all times to separate one section of the space on the outlet side of the straining means from another section of said space, means to prevent escape of fluid from each of said sections at different periods whilst escape of fluid from the other section continues, and means to move the piston to reduce the volume of each section separately the outlet of which is at that time closed thereby providing a cleaning flow of fluid in the opposite direction to that of the normal flow without withdrawing fluid for the cleaning flow from the section in which normal flow of fluid continues, the arrangement being such that said outlet port is in continuous communication through the straining means and strained fluid with the unstrained fluid.

4. Apparatus for straining fluids comprising cylindrical straining means having a cylindrical straining area, an outlet port in continuous communication with the unstrained fluid through the straining means and strained fluid, means for conducting the fluid so that it normally flows through the straining means from the outside thereof to the interior thereof, when it escapes through an outlet opening, a piston mounted for reciprocation within the straining means and within said straining area, and which piston constitutes a partition constantly dividing one section of the interior of the straining means from another section thereof, means other than the piston for closing communication between each section and the outlet opening at different periods and means for moving the piston to reduce the volume of each section separately the outlet of which is at that time closed thereby providing a cleaning flow of fluid in the opposite direction to that of the normal flow without withdrawing fluid for the cleaning flow from the section in which normal flow of fluid continues.

5. Apparatus as in claim 2 wherein the means for closing communication between one section and the outlet opening comprises a ported element which is movable so as at one time to close such communication between one section and the outlet opening and at another time to close such communication between another section and the outlet opening, said piston being arranged to reduce the volume of one section when it is moved in one direction and to reduce the volume of the said another section when it is moved in the other direction.

6. Apparatus for straining liquids or gases comprising a casing having an inlet and an outlet, straining means mounted within the casing, a piston mounted within the straining means, partitioning means dividing the space on the outlet side of the straining means into separate sections, means for reciprocating the piston first in one direction to effect reverse flow for cleaning through at least one section and then in the other direction to effect reverse flow through at least one other section, and means to close communication between the outlet and the section in which reverse flow cleaning is occurring whilst normal flow continues through another section.

7. Apparatus for straining liquids or gases as in claim 2, in which the piston is provided with an aperture affording communication from one side of the piston to the other side, and having tubular extensions on the piston, other tubular extensions adapted to be engaged by the tubular extensions on the piston to close communication between the outlet and the appropriate side of the piston according to the direction of movement of the piston, the arrangement being such that the tubular extensions on the piston engage neither of the other tubular extensions in the normal position of the piston so as to permit the whole of the straining means normally to be used for straining.

8. Apparatus for straining liquids or gases comprising a casing having an inlet and an outlet, a tubular straining body rotatably mounted within the casing, a cylinder within the strainer body and rotatable therewith and between which and the strainer body is a space, a piston within the cylinder, partitions dividing said space into separate sections one of which sections is in constant communication with the cylinder on one side of the piston and of the other of which sections is in constant communication with the cylinder on the other side of the piston, means to prevent rotary movement of the piston, a rib and slot engagement between the piston and the cylinder which causes reciprocation of the piston when the cylinder is rotated, and a valve plate rotatable with the strainer body and co-operating with the inlet and outlet to close communication from one section to the outlet whilst providing such communication between another section and the outlet.

9. Apparatus for straining liquids or gases comprising a casing having an inlet and an outlet, a tubular straining body rotatably mounted within the casing, a cylinder within the strainer body and rotatable therewith and between which and the strainer body is a space, a piston within the cylinder, partitions dividing said space into separate sections one of which sections is in constant communication with the cylinder on one side of the piston and the other of which sections is in constant communication with the cylinder on the other side of the piston comprises an extension, means for reciprocating the piston, means for rotating the straining body and cylinder, and a valve plate rotatable with the strainer body and co-operating with the inlet and outlet to close communication from one section to the outlet whilst providing such communication between another section and the outlet.

10. Apparatus as in claim 9, and having a member co-operating with the valve plate and provided with two outlet ports whereby in the normal position of the strainer body each section is in communication with an outlet port.

JOHN WARDLE.